(12) United States Patent
Tsubouchi et al.

(10) Patent No.: US 11,168,903 B2
(45) Date of Patent: Nov. 9, 2021

(54) AIR-CONDITIONING SYSTEM AND AIR-CONDITIONING SYSTEM CONTROLLER

(71) Applicant: Panasonic Intellectual Property Management Co., Ltd., Osaka (JP)

(72) Inventors: Masafumi Tsubouchi, Aichi (JP); Takuma Aramaki, Aichi (JP); Takaaki Nakasone, Aichi (JP); Naoyuki Funada, Aichi (JP); Ayumi Konishi, Aichi (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 17/268,513

(22) PCT Filed: Oct. 2, 2019

(86) PCT No.: PCT/JP2019/038974
§ 371 (c)(1),
(2) Date: Feb. 15, 2021

(87) PCT Pub. No.: WO2020/075596
PCT Pub. Date: Apr. 16, 2020

(65) Prior Publication Data
US 2021/0247079 A1 Aug. 12, 2021

(30) Foreign Application Priority Data

Oct. 11, 2018 (JP) .............................. JP2018-192204
Sep. 9, 2019 (JP) .............................. JP2019-163479
Sep. 9, 2019 (JP) .............................. JP2019-163480

(51) Int. Cl.
*F24F 11/62* (2018.01)
*F24F 3/14* (2006.01)
(Continued)

(52) U.S. Cl.
CPC ................ *F24F 3/14* (2013.01); *F24F 11/63* (2018.01); *F24F 11/77* (2018.01); *F24F 2110/20* (2018.01)

(58) Field of Classification Search
CPC .. F24F 11/63; F24F 11/64; F24F 1/008; F24F 1/0087; F24F 3/14; F24F 11/0008; F24F 11/77; F24F 2110/20
(Continued)

(56) References Cited

U.S. PATENT DOCUMENTS

2007/0178825 A1* 8/2007 Aronstam ................ F24F 11/30
454/290
2018/0299159 A1* 10/2018 Ajax .................... G05B 19/042
(Continued)

FOREIGN PATENT DOCUMENTS

JP   H03-204543 A   9/1991
JP   2004-012006 A  1/2004
(Continued)

OTHER PUBLICATIONS

International Search Report for corresponding Application No. PCT/JP2019/038974, dated Dec. 24, 2019.

*Primary Examiner* — Vivek K Shirsat
*Assistant Examiner* — Ko-Wei Lin
(74) *Attorney, Agent, or Firm* — Renner, Otto, Boisselle & Sklar, LLP

(57) ABSTRACT

An air-conditioning system includes a humidifier for humidifying air and a dehumidifier for dehumidifying air of an air-conditioned room, respectively, multiple transfer fans in each of multiple rooms to transfer air of the air-conditioned room to the rooms, a room humidity sensor for obtaining an indoor humidity of rooms, an air-conditioned room humidity sensor for obtaining a humidity of the air-conditioned room and a system controller. The system controller includes a humidity control section for controlling the humidifier and/or the dehumidifier to maintain the humidity within a humidity range, an air volume determining section for determining an air volume of each of the transfer fans according to the indoor humidity obtained by (Continued)

the room humidity sensor and the humidity obtained by the air-conditioned room humidity sensor and a fan air volume control section for controlling the air volume of the transfer fans according to the determined air volume.

12 Claims, 11 Drawing Sheets

(51) Int. Cl.
  *F24F 11/63* (2018.01)
  *F24F 11/77* (2018.01)
  *F24F 110/20* (2018.01)
(58) Field of Classification Search
  USPC .................. 454/229, 237, 239, 251, 253
  See application file for complete search history.

(56) References Cited

U.S. PATENT DOCUMENTS

| 2019/0268999 A1* | 8/2019 | Oobayashi | ............... F24F 11/74 |
| 2020/0240669 A1* | 7/2020 | Oshita | ..................... G01N 5/02 |

FOREIGN PATENT DOCUMENTS

| JP | 2011-174674 A | 9/2011 |
| JP | 2017-101859 A | 6/2017 |
| JP | 2017-101861 A | 6/2017 |

* cited by examiner

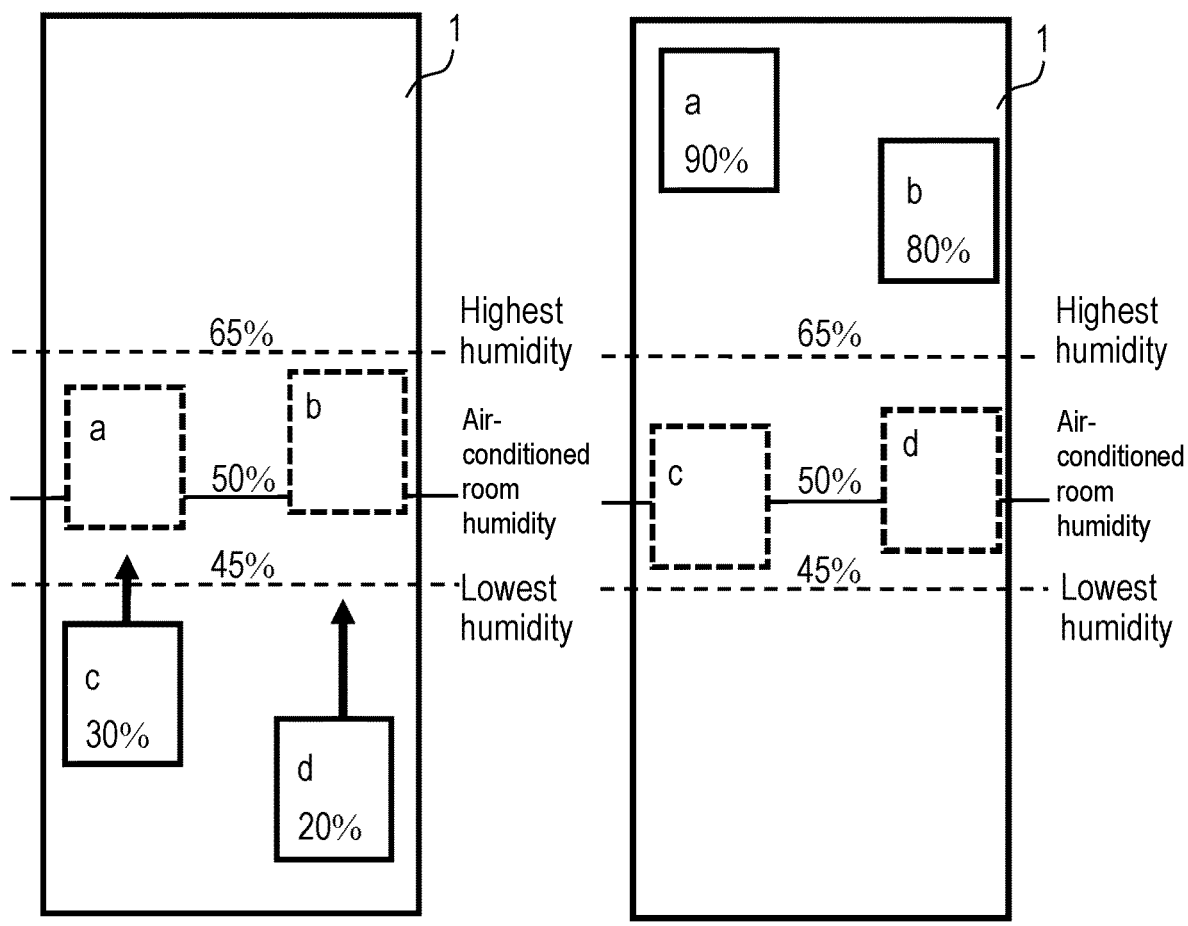

ated room, a second space communicated with the first space and independently disposed downstream of the first space, an air conditioner for conditioning air of the second space, the multiple transfer fans for transferring air conditioned by the air conditioner out of the air-conditioned room and the system controller for controlling the dehumidifier and the air conditioner. These components achieve the intended object.

AIR-CONDITIONING SYSTEM AND AIR-CONDITIONING SYSTEM CONTROLLER

TECHNICAL FIELD

The present disclosure relates to an air-conditioning system and an air-conditioning system controller.

BACKGROUND ART

Conventionally a residence is equipped with a whole-house air-conditioner for ventilation. Along with an increasing demand in energy-saving house and tightening regulations, a super-insulated house is expected to increase, therefore, an air-conditioning system suitable for such features is desired.

For example, as indicated in PTL 1, as a control device used in an air conditioner, there is a known one in which an ambient temperature and an ambient humidity are detected when starting the air conditioner and they are controlled to be comfortable according to environment as well as a target temperature and a target humidity are determined within a comfortable range to prevent wasteful energy consumption as much as possible.

CITATION LISTS

Patent Literatures

[PTL 1] Japanese Unexamined Patent Application Publication No. 2004-12006.

SUMMARY OF THE INVENTION

A temperature and humidity control by such a conventional air conditioner, especially for the humidity control, has been difficult to be used in a system which provides air conditioning in an air-conditioned room and ventilates multiple rooms by multiple transfer fans. That is, the conventional air conditioner provides a comfortable humidity environment by detecting an ambient humidity and then setting a target humidity to maintain and control the target humidity. The humidity in a room equipped with the air conditioner is under control of the air conditioner, the humidity is not essentially subject to little exterior influence.

On the other hand, as the above described system is connected to the multiple rooms, air of different humidity flows into the air-conditioned room and shortly brings a significant change in humidity environment of the air-conditioned room. Therefore, to control such humidity in the air-conditioned room within a specified range, it has been necessary to control the humidity by building a very large space enough to the multiple rooms or to significantly increase a dehumidifying and humidifying capacity. However such measures are inefficient in terms of space or energy, therefore, a new humidity control device has been desired.

The present disclosure solves the above described conventional issues and intends to provide an air-conditioning system and an air-conditioning system controller contributing to a downsized air-conditioned room by efficient dehumidification and humidification.

To achieve this object, the air-conditioning system of the present disclosure includes a humidifier for humidifying air of the air-conditioned room and a dehumidifier for dehumidifying the air of the air-conditioned room, the multiple transfer fans installed in each of the multiple rooms for transferring the air of the air-conditioned room to each of the multiple rooms independent from the air-conditioned room, a system controller for controlling the humidifier, dehumidifier and the multiple transfer fans, a room humidity sensor for obtaining an indoor humidity of each of the multiple rooms to transmit it to the system controller and an air-conditioned room humidity sensor for obtaining a humidity of the air-conditioned room to transmit it to the system controller. The system controller includes an air-conditioned room humidity control section for controlling at least one of the humidifier and the dehumidifier to maintain the humidity of the air-conditioned room within the specified humidity range defined by the lowest humidity and the highest humidity, an air volume determining section for determining an air volume of the transfer fan for each of the multiple rooms according to the indoor humidity of each of the multiple rooms obtained by the room humidity sensor and the humidity of the air-conditioned room obtained by the air-conditioned room humidity sensor and a fan air volume control section for controlling an air volume of each of the multiple transfer fans at the air volume determined by the fan air volume control section. These components achieve an intended object.

The present disclosure also relates to the air-conditioning system controller for controlling the humidifier to humidify the air of the air-conditioned room, the dehumidifier to dehumidify the air of the air-conditioned room and the multiple transfer fans installed in each of the multiple rooms to transfer the air of the air-conditioned room to each of the multiple rooms independent from the air-conditioned room. The air-conditioning system controller includes the air-conditioned room humidity control section for controlling at least one of the humidifier and the dehumidifier to maintain the humidity of the air-conditioned room within the specified humidity range defined by the lowest humidity and the highest humidity, the air volume determining section for determining the air volume of the transfer fan for each of the multiple rooms according to the indoor humidity of each of the multiple rooms and the humidity of the air-conditioned room and the fan air volume control section for controlling the air volume of each of the multiple transfer fans according to the air volume determined by the air volume determining section. These components achieve the intended object.

The present disclosure also relates to the air-conditioning system having the air-conditioned room for ventilating multiple spaces and the air-conditioned room includes a first space having an air supply opening, the dehumidifier for dehumidifying air of the first space, a second space communicated with the first space and independently disposed downstream of the first space, an air conditioner for conditioning air of the second space, the multiple transfer fans for transferring air conditioned by the air conditioner out of the air-conditioned room and the system controller for controlling the dehumidifier and the air conditioner. These components achieve the intended object.

The present disclosure can provide the air-conditioning system contributing to the downsized air-conditioned room by the efficient dehumidification and humidification.

BRIEF DESCRIPTION OF DRAWINGS

FIG. 7A shows an example of relationship between an air-conditioned room target humidity, an air-conditioned room humidity and a room humidity.

FIG. 7B shows another example of relationship between the air-conditioned room target humidity, the air-conditioned room humidity and the room humidity.

DESCRIPTION OF EMBODIMENTS

Embodiments of the present disclosure are explained hereinafter with reference to the accompanying drawings. The embodiments hereinafter show preferred concrete examples of the present disclosure. Therefore, values, configuration, material, component, its arrangement position and connection configuration as well as steps (processes) and their order indicated in the embodiments hereinafter are only examples and are not intended to limit a scope of the present disclosure. Therefore, among the components described in the embodiments hereinafter, those not described in independent claims showing the most significant concepts of the present disclosure are explained as voluntary components. In the figures, the same symbols are used for the components which are substantially the same each other and the repeated explanation is omitted or simplified.

First Embodiment

Figure 1:
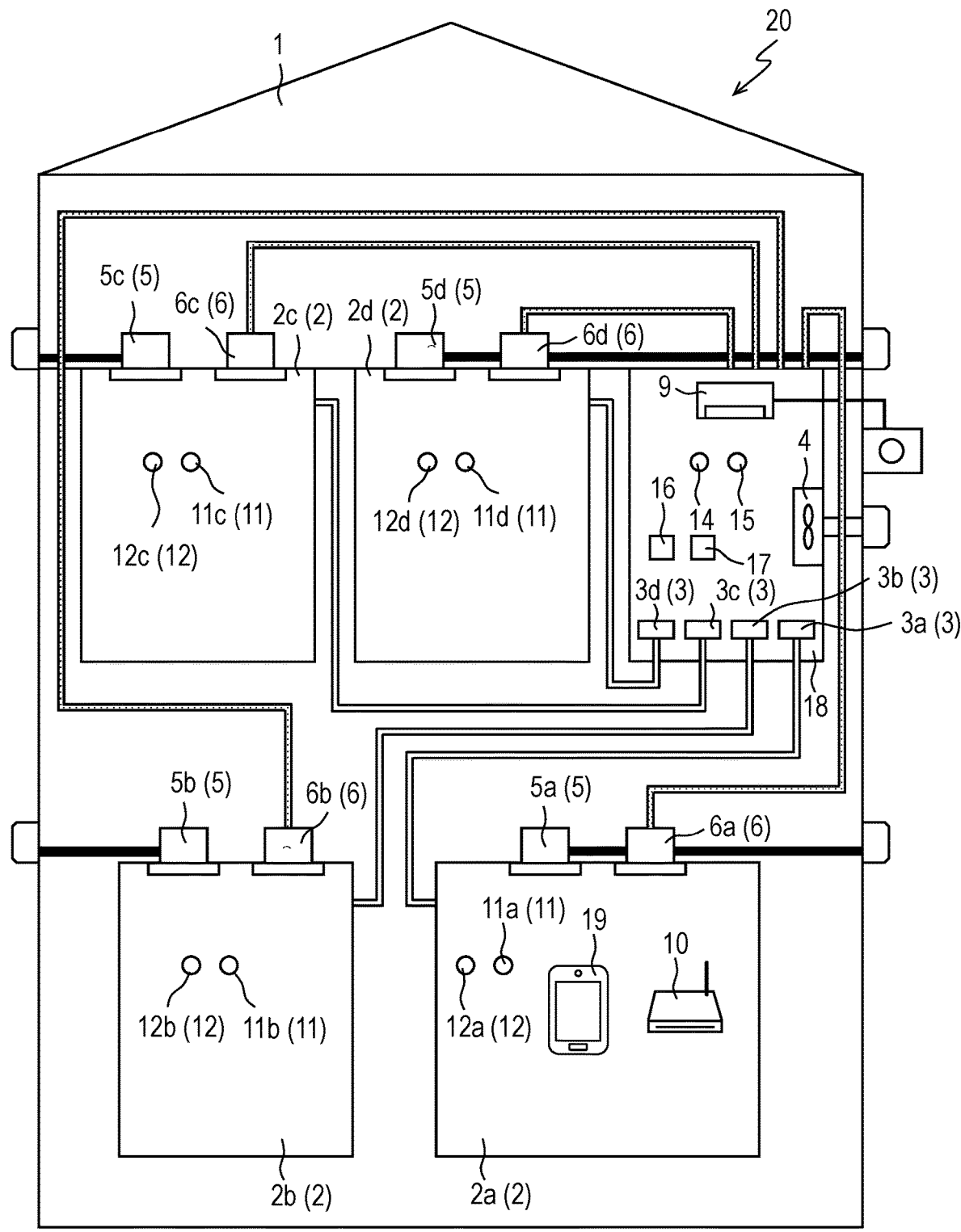
FIG. 1 is a connection schematic view of an air-conditioning system in accordance with a first embodiment of the present disclosure.

Firstly, air-conditioning system 20 in accordance with a first embodiment of the present disclosure is explained with reference to FIG. 1. FIG. 1 is a connection schematic view of air-conditioning system 20 in accordance with the first embodiment of the present disclosure.

Air-conditioning system 20 includes outdoor air introducing fan 4, multiple exhaust fans 5 (5a, 5b, 5c and 5d), multiple transfer fans 3 (3a, 3b, 3c and 3d), multiple circulation fans 6 (6a, 6b, 6c and 6d), room temperature sensors 11 (11a, 11b, 11c and 11d), room humidity sensors 12 (12a, 12b, 12c and 12d), air-conditioned room temperature sensor 14, air-conditioned room humidity sensor 15, air conditioners 9, humidifier 16, dehumidifier 17, input/output terminal 19 and system controller 10 (equal to an air-conditioning system controller).

Air-conditioning system 20 is disposed in general residence 1 of an example building. General residence 1 includes multiple rooms 2 (2a, 2b, 2c and 2d) and at least one air-conditioned room 18 independent (separate) from them (4 rooms for the embodiment). General residence 1 (residence) here means one provided as where residents live their private lives and it generally includes a living room, a dining room, bedrooms, a private room and a nursery. Rooms served by air-conditioning system 20 may be a toilet, a bathroom, a restroom or a dressing room.

In air-conditioned room 18, air transferred from each of multiple room 2 is mixed each other. Outdoor air introducing fan 4 introduces outdoor air into air-conditioned room 18 and the introduced outdoor air is mixed with the air transferred from each of multiple room 2 by each of multiple circulation fan 6. Temperature and humidity of the air of air-conditioned room 18 is controlled, that is, air conditioned by air conditioner 9, humidifier 16 and dehumidifier 17 disposed in air-conditioned room 18 to generate air to be transferred to each of multiple room 2. The conditioned air of air-conditioned room 18 is transferred to each of multiple room 2 by each of multiple transfer fan 3. Air-conditioned room 18 means a certain volume of space where it can accommodate air conditioner 9, humidifier 16 and dehumidifier 17 and can control air conditioning of the multiple rooms, however, it does not essentially intend to provide a space where residents stay.

The air in each of multiple room 2 is not only transferred to air-conditioned room 18 by each of multiple circulation fan 6 but also exhausted by each of multiple exhaust fan 5 from each of multiple room 2 outside general residence 1 as outdoor air. Air-conditioning system 20 provides Class 1 ventilation by simultaneously controlling both an exhaust volume of each of multiple exhaust fan 5 for exhausting indoor air and an air supply volume of outdoor air introducing fan 4 for introducing the outdoor air.

Outdoor air introducing fan 4 takes the outdoor air into general residence 1 and is equal to a function of an air supply fan or a heat-exchange ventilation fan. As described above, the outdoor air from outdoor air introducing fan 4 is introduced into air-conditioned room 18. Outdoor air introducing fan 4 is configured to be able to set multiple supply air volumes according to the exhaust volume of each of multiple exhaust fan 5 as described later.

Each of multiple exhaust fan 5 exhausts part of the air of each of multiple room 2 outside through an exhaust duct and is equal to a function of a ceiling-embedded ventilation fan, a wall-mounted ventilation fan, a range hood or a heat-exchange ventilation fan. In FIG. 1, the duct connected to each of multiple exhaust fan 5 is directly connected outside general residence 1, however, to use the exhaust function of the heat-exchange ventilation fan, the duct is first connected to the heat-exchange ventilation fan, then connected outside general residence 1. That is, air through the exhaust duct is first heat exchanged with air through an air supply duct of the heat-exchange ventilation fan, then exhausted outside general residence 1. Exhaust fan 5a is disposed in room 2a, and equally exhaust fans 5b, 5c and 5d are disposed in room 2b, 2c and 2d.

The exhaust volume of each of multiple exhaust fan 5 is configured to be able to set multiple exhaust volumes. At normal times, the exhaust volume of each of multiple exhaust fan 5 is controlled so as to achieve a previously-set exhaust volume. Additionally the exhaust volume of each of multiple exhaust fan, 5a through 5d, is also controlled according to an air volume set by a user or obtained by various sensors.

Multiple transfer fan 3a through 3d are disposed in each of multiple room 2a through 2d, for example, on a wall of air-conditioned room 18. The air of air-conditioned room 18 is transferred to room 2a through a transfer duct by transfer fan 3a, equally transferred to room 2b through the transfer duct by transfer fan 3b, room 2c through the transfer duct by transfer fan 3c and room 2d through the transfer duct by transfer fan 3d. The transfer duct connected to the room is independently installed.

Circulation fan 6a is disposed in room 2a, equally circulation fan 6b is disposed in room 2b, circulation fan 6c is disposed in room 2c and circulation fan 6d is disposed in room 2d. Part of the air of each of multiple room 2a through 2d is transferred to air-conditioned room 18 by multiple circulation fan 6a through 6d through circulation ducts. The circulation ducts connected between air-conditioned room 18 and each of the multiple rooms may be independently installed, however these multiple circulation ducts may be unified into one circulation duct before air-conditioned room 18 and then connected to it.

Air conditioner 9 is equal to a component for conditioning air and controls the air of air-conditioned room 18. Air conditioner 9 cools or heats the air of air-conditioned room 18 so that temperature of air-conditioned room 18 can reach a target temperature (air-conditioned room target temperature).

Humidifier 16 humidifies the air of air-conditioned room 18, if the humidity of air-conditioned room 18 is lower than a target humidity (air-conditioned room target humidity), so as to achieve the air-conditioned room target humidity. Humidifier 16 may be built in air conditioner 9, however, it's desirable to install humidifier 16 independent from air conditioner 9 for obtaining humidifying capacity enough to humidify the multiple rooms. The air-conditioned room target humidity is within a specified humidity range defined by the lowest (minimum) humidity and the highest (maximum) humidity. The lowest humidity, the highest humidity and the humidities described in the embodiments are expressed in relative humidity, however, they may be absolute humidity by providing a specified transform processing to them. In this case, it's preferable to apply the absolute humidity to the whole air-conditioning system including the room humidity.

Dehumidifier 17 dehumidifies the air of air-conditioned room 18, if the humidity of air-conditioned room 18 is higher than the target humidity previously set (air-conditioned room target humidity), so as to achieve the air-conditioned room target humidity. Dehumidifier 17 may be built in air conditioner 9, however, it's desirable to install dehumidifier 17 independent from air conditioner 9 for obtaining dehumidifying capacity enough to dehumidify multiple room 2.

Room temperature sensor 11a is disposed in room 2a, equally room temperature sensor 11b is disposed in room 2b, temperature sensor 11c is disposed in room 2c and temperature sensor 11d is disposed in room 2d. Multiple room temperature sensor 11a through 11d obtain an indoor temperature of each of the multiple rooms to transmit it to system controller 10.

Room humidity sensor 12a is disposed in room 2a, equally room humidity sensor 12b is disposed in room 2b, humidity sensor 12c is disposed in room 2c and humidity sensor 12d is disposed in room 2d. Multiple room humidity sensor 12a through 12d obtain the indoor humidity of each of the multiple rooms to transmit it to system controller 10.

Air-conditioned room temperature sensor 14 obtains the temperature of air-conditioned room 18 to transmit it to system controller 10. Air-conditioned room temperature sensor 14 may be built in air conditioner 9, however, in that case, it can obtain only information around air conditioner 9 (for example, information around an air supply inlet). As described above, the outdoor air and the air transferred from multiple room 2 are mixed in air-conditioned room 18, therefore, it's desirable to install it independent from air conditioner 9 so as to obtain whole information on air-conditioned room 18.

Air-conditioned room humidity sensor 15 obtains the humidity of air-conditioned room 18 to transmit it to system controller 10. For the same reason as that for air-conditioned room temperature sensor 14, it's desirable to install it independent from air conditioner 9 so as to obtain whole information on air-conditioned room 18.

System controller 10 controls overall air-conditioning system 20. System controller 10 is wirelessly connected in such a way as to be able to communicate with outdoor introducing fan 4, multiple exhaust fan 5, multiple transfer fan 3, multiple circulation fan 6, multiple room temperature sensor 11, multiple room humidity sensor 12, air-conditioned room temperature sensor 14, air-conditioned room humidity sensor 15, air conditioner 9, humidifier 16 and dehumidifier 17.

System controller 10 simultaneously controls outdoor air introducing fan 4 and multiple exhaust fan 5 by setting the air supply volume of outdoor air introducing fan 4 according to the exhaust volume of each of multiple exhaust fan 5. This provides general residence 1 with Class 1 ventilation.

System controller 10 controls air conditioner 9, humidifier 16 and dehumidifier 17 according to the temperature and humidity of air-conditioned room 18 obtained by air-conditioned room temperature sensor 14 and air-conditioned room humidity sensor 15 such that the target temperature and/or humidity set to air-conditioned room 18 can be achieved.

Moreover, system controller 10 sets the air volume of each of multiple transfer fan 3 and the air volume of each of multiple circulation fan 6 according to the indoor temperature and/or indoor humidity of each of multiple room 2 obtained by multiple room temperature sensor 11 and multiple room humidity sensor 12 and the target temperature (room target temperature) and/or the target humidity (room target humidity) set separately to each of multiple room 2a through 2d.

As such, the air conditioned in air-conditioned room 18 is transferred to each of multiple room 2 at the air volume set to each of multiple transfer fan 3 and the air of each of multiple room 2 is transferred to air-conditioned room 18 at the air volume set to each of multiple circulation fan 6. Thus, the indoor temperature and/or the indoor humidity of each of multiple room 2 are controlled such that the room target temperature and/or the room target humidity can be achieved.

No complicated wiring is required by connecting system controller 10 with outdoor air introducing fan 4, multiple exhaust fan 5, multiple transfer fan 3, multiple circulation fan 6, multiple room temperature sensor 11, multiple room humidity sensor 12, air-conditioned room temperature sensor 14, air-conditioned room humidity sensor 15, air conditioner 9, humidifier 16 and dehumidifier 17 using wireless communication. On the other hand, it may be configured to connect all of these with each other or connect system controller 10 with a part of them by wired communication.

Input/output terminal 19 is connected in such a way to be able to communicate with system controller 10 by wireless communication. Input/output terminal 19 receives information required to construct air-conditioning system 20 to store it on system controller 10 or displays a status of air-conditioning system 20 obtained from system controller 10. An example of input/output terminal 19 is a portable information terminal such as a mobile phone, smart phone, or tablet.

Input/output terminal 19 may not always be connected to system controller 10 by the wireless communication, therefore, it may be connected to system controller 10 using the wired communication. For example, input/output terminal 19 may be a remote controller mounted on a wall.

Figure 2:
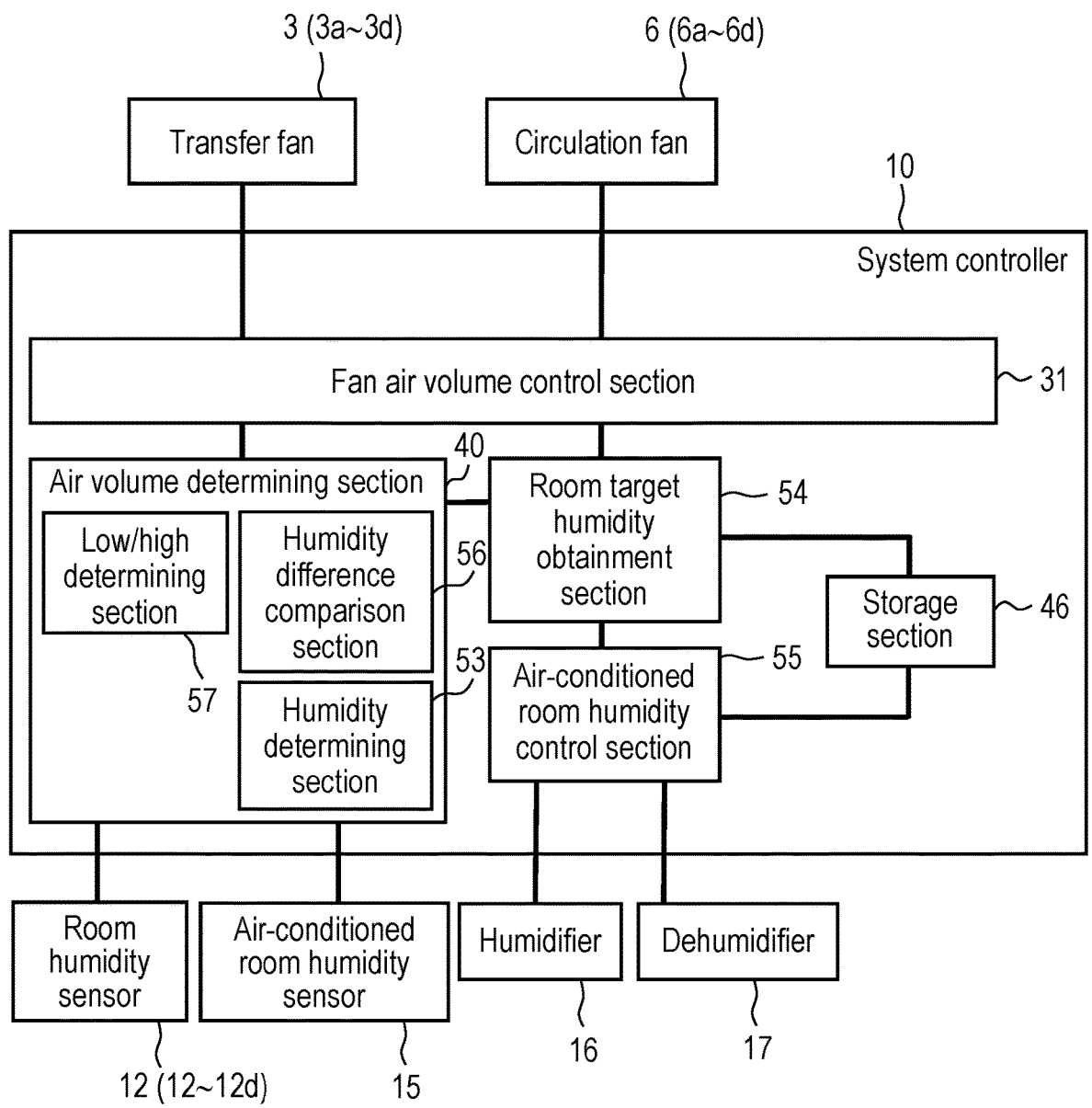
FIG. 2 is a schematic function block diagram of a system controller of the air-conditioning system.

Next, functions of system controller 10 are explained with reference to FIG. 2. FIG. 2 is a schematic function block diagram of system controller 10.

System controller 10 includes room target humidity obtainment section 54, air-conditioned room humidity control section 55, air volume determining section 40, fan air volume control section 31 and storage section 46.

Room target humidity obtainment section 54 obtains the room target humidity set common to each of multiple room 2a through 2d from input/output terminal 19. The room target humidity is set within the specified humidity range defined by the lowest humidity limit and the highest humidity limit. In the embodiment, the room target humidity is equal to the air-conditioned room target humidity. And, in the embodiment, a user can set the room target humidity, however, it may be previously set to the air-conditioning system as a fixed value. The lowest humidity and the highest humidity obtained by room target humidity obtainment section 54 or previously set are stored in storage section 46.

Air-conditioned room humidity control section 55 controls the humidity of the air-conditioned room to reach the target humidity obtained by room target humidity obtainment section 54 by using humidifier 16 and dehumidifier 17. Specifically, if the humidity of the air-conditioned room obtained by air-conditioned room humidity sensor 15 is higher than the highest humidity within the specified humidity range, air-conditioned room humidity control section 55 activates dehumidifier 17. And if the humidity of the air-conditioned room obtained by air-conditioned room humidity sensor 15 is lower than the lowest humidity within the specified humidity range, air-conditioned room humidity control section 55 activates humidifier 16.

Air volume determining section 40 includes humidity determining section 53, humidity difference comparison section 56 and low/high determining section 57. Air-volume determining section 40 determines the air volume of each of multiple transfer fan 3 according to the indoor humidity of each of the multiple rooms obtained by each of multiple room humidity sensor 12 and the humidity of air-conditioned room 18 obtained by air-conditioned room humidity sensor 15. An air volume determining procedure is explained later.

Humidity determining section 53 determines whether the indoor humidity of each of multiple room 2 is within the specified humidity range according to the indoor humidity of each of multiple room 2 obtained by each of multiple room humidity sensor 12 and the room target humidity of each of the multiple rooms obtained by room target humidity obtainment section 54, that is, the air-conditioned room target humidity within the specified humidity range.

Humidity difference comparison section 56 calculates the difference between the indoor humidity of each of the multiple rooms obtained by multiple room humidity sensor 12 and the humidity of air-conditioned room 18 obtained by each of multiple air-conditioned room humidity sensor 15. Specifically, for example, if the humidity of room 2a is 90% and the humidity of air-conditioned room 18 is 50%, the difference is 40%. In calculating the difference in humidity, it is not always required to express it in %, for example, it may be calculated from an amount of moisture obtainable from the humidity, that is, it is enough to quantify how much the difference is between them.

Low/high determining section 57 determines whether the indoor humidity of each of the multiple rooms obtained by each of multiple room humidity sensor 12 is lower or higher than the humidity of air-conditioned room 18 obtained by air-conditioned room humidity sensor 15. Specifically, for example, if the humidity of room 2a is 90% and the humidity of the air-conditioned room is 50%, low/high determining section 57 determines that the humidity of room 2a is "higher" than that of the air-conditioned room, 50%. On the other hand, if the humidity of room 2c is 30% and the humidity of the air-conditioned room is 50%, low/high determining section 57 determines that the humidity of room 2c is "lower" than that of the air-conditioned room, 50%. Low/high determining section 57 may provide these decisions for all rooms or only for rooms where the humidity is higher than the highest humidity and it is lower than the lowest humidity.

Fan air volume control section 31 controls the air volume of each of multiple transfer fan 3a through 3d so that they can transfer the air volume determined by air-volume determining section 40 to each of multiple room 2a through 2d. Fan air volume control section 31 may also control each of multiple circulation fan 6a through 6d, however, the detailed explanation is omitted here.

Storage section 46 is, so called, a memory which stores the specified humidity range obtained by room target humidity obtainment section 54 or previously set, that is, the highest and lowest humidity. Storage section 46 is also used if control by system controller 10 requires information such as numerical values to be stored.

Figure 3:
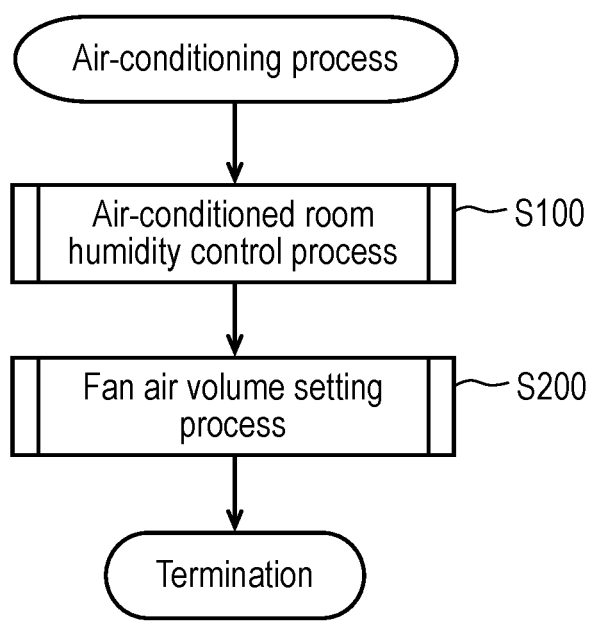
FIG. 3 is a flow chart showing an air conditioning process.
Figure 4:
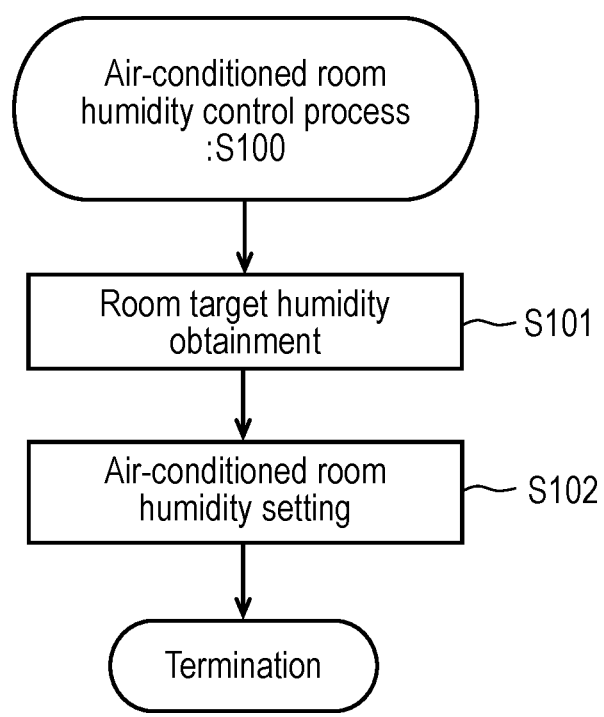
FIG. 4 is a flow chart showing an air-conditioned room humidity controlling process.
Figure 5:
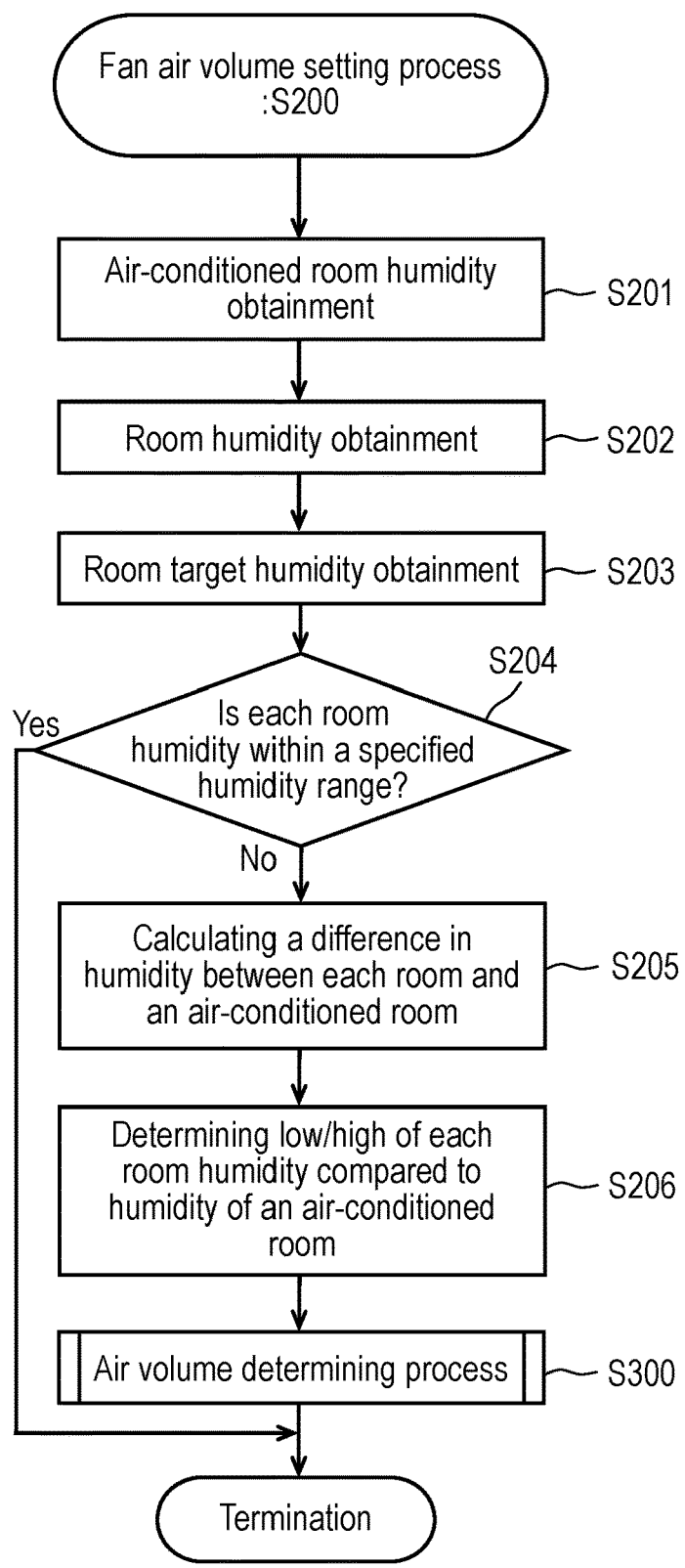
FIG. 5 is a flow chart showing a fan air volume setting process.
Figure 6:
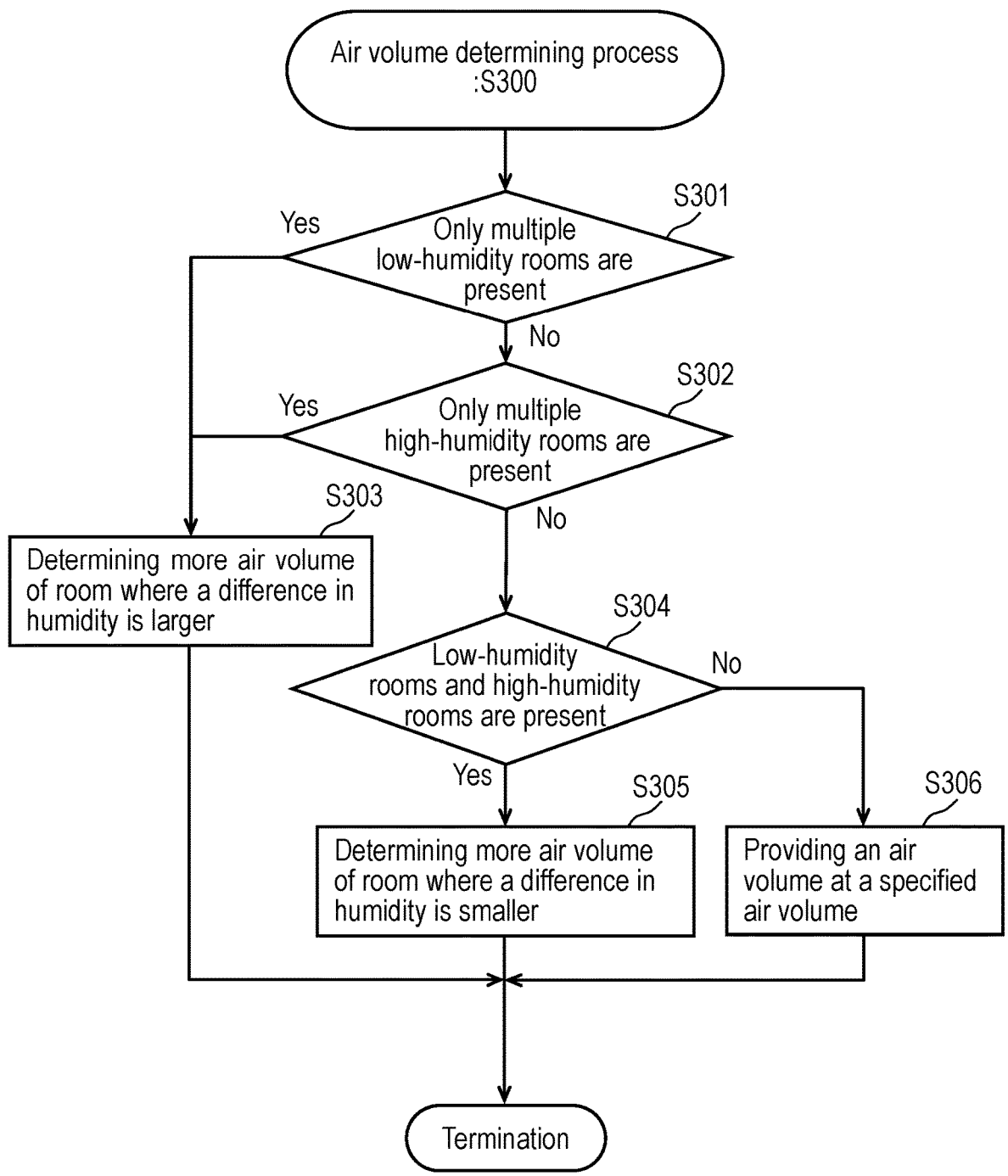
FIG. 6 is a flow chart showing an air volume determining process.
Figure 8A:
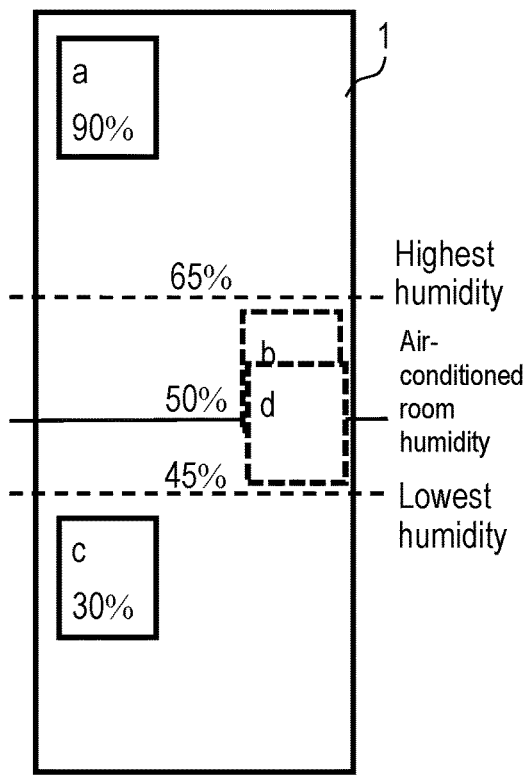
FIG. 8A shows yet another example of relationship between the air-conditioned room target humidity, the air-conditioned room humidity and the room humidity.
Figure 8B:
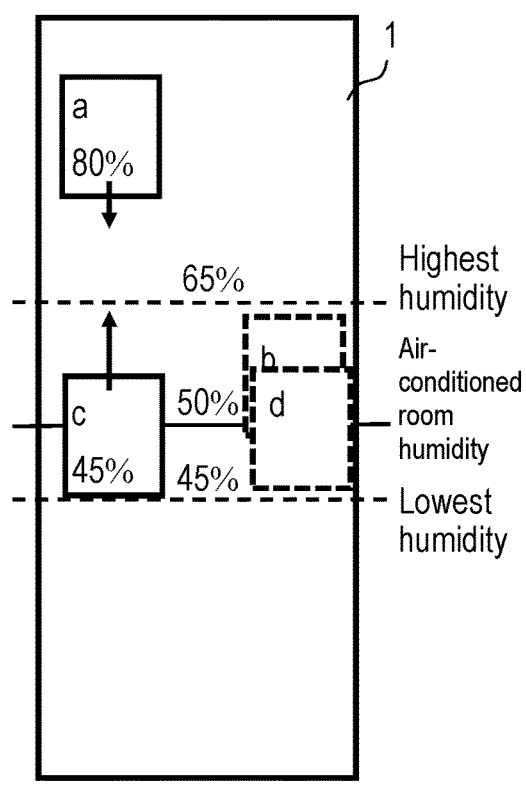
FIG. 8B shows yet another example of relationship between the air-conditioned room target humidity, the air-conditioned room humidity and the room humidity.
Figure 8C:
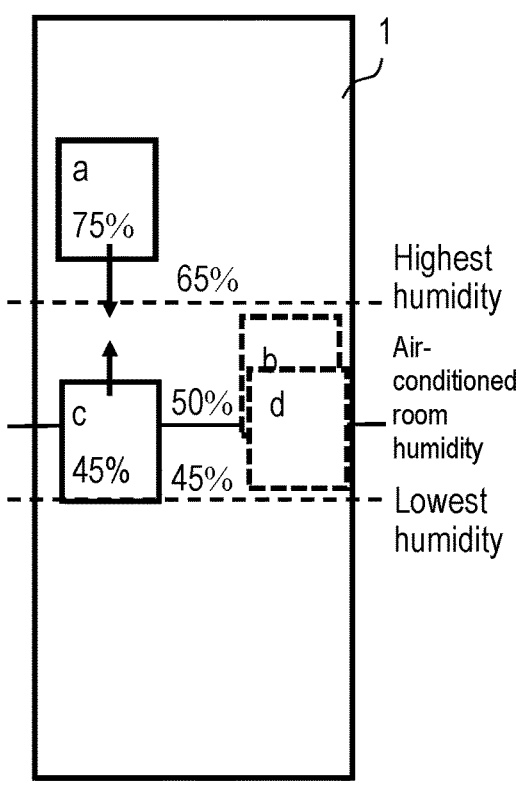
FIG. 8C shows yet another example of relationship between the air-conditioned room target humidity, the air-conditioned room humidity and the room humidity.

Next, an air conditioning process executed by system controller 10 is explained with reference from FIG. 3 through FIG. 8C. FIG. 3 is a flow chart showing the air conditioning process. FIG. 4 is a flow chart showing an air-conditioned room humidity controlling process. FIG. 5 is a flow chart showing a fan air volume setting process. FIG. 6 is a flow chart showing an air volume determining process. FIG. 7A and FIG. 7B are examples showing relationship between the target humidity of the air-conditioned room, the humidity of the air-conditioned room and the room humidity. FIG. 8A, FIG. 8B and FIG. 8C are another examples showing relationship between the target humidity of the air-conditioned room, the humidity of the air-conditioned room and the room humidity.

The air-conditioning process executed by system controller 10, as indicated in FIG. 3, mainly includes air-conditioned room humidity control process S100 and fan air volume setting process S200 and they are executed in this order.

If the user executes the air-conditioning process, system controller 10 executes air-conditioned room humidity control process S100 first indicated in FIG. 4.

In air-conditioned room humidity control process S100, system controller 10 obtains the room target humidity of each of the multiple rooms set by input/output terminal 19 to store it in storage section 46 (S101). The room target humidity here means one at which the user feels comfortable, it is common to all the rooms. The room target humidity is within the specified humidity range defined by the lowest humidity limit and the highest humidity limit. The specified humidity range includes the target humidity of air-conditioned room 18, that is, the room target humidity is equal to the target humidity of the air-conditioned room. For example, the user sets the highest humidity of 65% and the lowest humidity of 45 to input/output terminal 19, then system controller 10 obtains the room target humidity input to input/output terminal 19 from target humidity obtainment section 54 as the target humidity of the air-conditioned room.

System controller 10 obtains the target humidity of the air-conditioned room, then air-conditioned room humidity control section 55 maintains the humidity of air-conditioned room 18 within the air-conditioned room target humidity range by using air-conditioned room humidity sensor 15, humidifier 16 and dehumidifier 17 (S102).

Specifically, the target humidity of the air-conditioned room is maintained as described hereinafter. That is, if the humidity of the air-conditioned room obtained by air-conditioned room humidity sensor 15 is higher than the highest humidity, dehumidifier 17 is activated. And if the humidity of the air-conditioned room obtained by air-conditioned room humidity sensor 15 is lower than the lowest humidity, humidifier 16 is activated. Here, it is required to consider fluctuation in the humidity of the air-conditioned room due to air entering into air-conditioned room 18 after the air-conditioned room humidity control process. Given that the humidity of the air-conditioned room is within the specified humidity range, for example, the air-conditioned room may be dehumidified to reach a lower level within a certain range (for example, minus 5%) compared to the highest humidity. And the air-conditioned room may be humidified to reach a higher level within the certain range (for example, plus 5%) compared to the lowest humidity.

The above process maintains the humidity of air-conditioned room 18 within the specified humidity range.

Then, system controller 10 executes fan air volume setting process (S200) as indicated in FIG. 5.

In fan air volume setting process (S200), air volume determining section 40 obtains the humidity of the air-conditioned room through air-conditioned room humidity sensor 15 (S201). And air volume determining section 40 obtains the humidity of each of multiple room 2 through each of multiple room humidity sensor 12 (S202). Additionally, system controller 10 obtains the specified humidity range, that is, the highest humidity and the lowest humidity, from storage section 46 through room target humidity obtainment section 54 (S203).

Next, air volume determining section 40 determines whether the humidity of each of the multiple rooms is within the specified humidity range through humidity determining section 53 (S203).

Here, the air conditioning process terminates if the humidity of each of the multiple rooms is within the specified humidity range (S204: Yes→termination).

If the humidity of at least one of the multiple rooms is not within the specified humidity range, humidity difference comparison section 56 calculates the difference in humidity between such room and the air-conditioned room (S204: No→S205). Additionally, low/high determining section 57 determines whether the humidity of such room is higher or lower than that of the air-conditioned room (S206). Here, both comparing the humidity of the air-conditioned room obtained by air-conditioned room humidity sensor 15 with the humidity of such room and determining whether the humidity of such room is lower or higher compared to the specified humidity range brings the same result. Low/high determining section 57 not only classifies each of multiple room 2 (2a through 2d) where the humidity is not within the specified humidity range into high-humidity rooms higher than the highest humidity and low-humidity rooms lower than the lowest humidity, but also associates the difference in humidity to that compared by humidity difference comparison section 56. That is, air volume determining section 40 can obtain the number of the high-humidity rooms and low-humidity rooms and the difference in humidity between such room and the air-conditioned room in this process.

After the above process terminates, air volume determining section 40 executes an air volume determining process (S300).

Air volume determining section 40 executes the air volume determining process (S300) indicated in FIG. 6. That is, in this process, air volume determining section 40 first counts the number of the low-humidity rooms and the high-humidity rooms compared to the humidity of the air-conditioned room.

Here, if only the low-humidity rooms are present, air volume determining section 40 determines more air volume of the room where the difference in humidity is larger from the air-conditioned room (S301: Yes→S303). This process is explained in detail with reference to FIG. 7A. FIG. 7A shows an example where only the low-humidity rooms are present. In FIG. 2, a shows room 2a, equally b shows room 2b, c shows room 2c and d shows room 2d, and the numerical values below show the room humidities. It's assumed that the highest humidity is 65%, the lowest humidity is 45% and the humidity of the air-conditioned room is 50%.

Only two low-humidity rooms (room 2c and room 2d) are present according to FIG. 7A. Each of the difference in humidity of room 2c and room 2d from the air-conditioned room is 20% and 30% (absolute value). In this case, air volume determining section 40 sets more air volume of transfer fan 3d disposed in room 2d where the difference in humidity is larger from the air-conditioned room than transfer fan 3c disposed in room 2c. Here, the air volume can be considered as the transfer fan capacity or an operating notch. For example, if the air volume of each of multiple transfer 3 can be set in ascending (volume) order between Air Volume 1 and Air Volume 10, air volume determining section 40 sets the air volume of transfer fan 3d to Air Volume 10 of maximum. And air volume determining section 40 sets, for example, the air volume of transfer fan 3c to Air Volume 7, which is smaller than that of transfer fan 3d.

This brings air of the air-conditioned room to room 2c and room 2d, each of the room humidities gradually gets close within the specified humidity range. In this case, due to the difference in the air volume, the humidity of room 2d where the difference in humidity from the air-conditioned room is larger, considered as being more uncomfortable, is improved faster than that of room 2c where the difference in humidity from the air-conditioned room is smaller. That is, air volume determining section 40 prioritizes improving the room with worse humidity environment.

In this case, as the humidity of the air-conditioned room gradually reduces from 50% due to dry air entering from room 2c and room 2d, if it is likely to be below the lowest humidity, air-conditioned room humidity control section 55 activates humidifier 16 accordingly to maintain the humidity of the air-conditioned room within the specified humidity range.

And, air volume determining section 40 counts the number of the low-humidity rooms and high-humidity rooms, if only the high-humidity rooms are present, it sets more air volume of the room where the difference in humidity from the air-conditioned room is larger in the same manner (S301: No→S302: Yes→S303).

This process is explained in detail with reference to FIG. 7B. FIG. 7B shows an example where only high-humidity rooms are present.

Only two high-humidity rooms (room 2a, room 2b) are present according to FIG. 7B. Each of the difference in humidity (absolute value) of room 2a and room 2b compared to the air-conditioned room is 40% and 30%. In this case, air volume determining section 40 sets more air volume of transfer fan 3a disposed in room 2a where the difference in humidity from the air-conditioned room is larger than transfer fan 3b disposed in room 2b. That is, air volume determining section 40 sets the air volume of transfer fan 3a to Air Volume 10 of maximum. And air volume determining section 40 sets, for example, the air volume of transfer fan 3b to Air Volume 7, which is smaller than that of transfer 3a.

This brings the air of the air-conditioned room to room 2a and room 2b, each of the room humidities gradually gets close within the specified humidity range. In this case, due to the difference in the air volume, the humidity of room 2a where the difference in humidity from the air-conditioned room is larger, considered as being more uncomfortable, is improved faster than room 2b where the difference in humidity from the air-conditioned room is smaller. That is, air volume determining section 40 prioritizes improving the room with worse humidity environment.

In this case, as the humidity of the air-conditioned room gradually increases from 50% due to moist air entering from room 2a and room 2b, if it is likely to be above the highest humidity, air-conditioned room humidity control section 55 activates dehumidifier 17 accordingly to maintain the humidity of the air-conditioned room within the specified humidity range.

And, air volume determining section 40 counts the number of the low-humidity rooms and high-humidity rooms, if both high-humidity rooms and low-humidity rooms are present, it sets more air volume of the room where the difference in humidity from the air-conditioned room is smaller (S302: No→S304: Yes→S305).

This process is explained in detail with reference to FIG. 8A, FIG. 8B and FIG. 8C. FIG. 8A shows an example where both high-humidity rooms and low-humidity rooms are present. The expression in FIG. 8A is equal to that in FIG. 7A and FIG. 7B.

Low-humidity room 2c and high-humidity room 2a are present according to FIG. 8A. Each of the difference in humidity of room 2c and room 2a compared to the air-conditioned room is 20% and 40%. In this case, air volume determining section 40 sets less air volume of transfer fan 3a disposed in room 2a where the difference in humidity from the air-conditioned room is larger than transfer fan 3c disposed in room 2c where the difference in humidity from the air-conditioned room is smaller. In other words, air volume determining section 40 sets more air volume of transfer fan 3c disposed in room 2c where the difference in humidity from the air-conditioned room is smaller than transfer fan 3a disposed in room 2a where the difference in humidity from the air-conditioned room is larger. Specifically, air volume determining section 40 sets the air volume of transfer fan 3c to Air Volume 10 of maximum. And air volume determining section 40 sets, for example, the air volume of transfer fan 3a to Air Volume 5, which is smaller than that of transfer fan 3c.

This brings the air of the air-conditioned room to room 2a and room 2c, each of the room humidities gradually gets close within the specified humidity range. In this case, as indicated in FIG. 8B, the humidity of room 2c where the difference in humidity from the air-conditioned room is smaller is first improved due to the difference in the air volume.

This process is different from S303 in that it minimizes fluctuation in humidity of the air-conditioned room by controlling the amount of air volume entering from each of the two rooms. That is, this process controls to provide more air volume from the low-humidity room where the difference in humidity is smaller into the air-conditioned room compared to that from the high-humidity room where the difference in humidity is larger so that moisture inflow into and outflow from the air-conditioned room can be ideally equivalent. This can minimize the fluctuation in humidity of the air-conditioned room, therefore, it can also reduce operation of humidifier 16 and dehumidifier 17 leading to energy efficiency control. And the air-conditioned room can be efficiently operated in terms of humidity and also can be downsized.

And, air volume determining section 40 may set the same air volume between transfer fan 3c in room 2c where the difference in humidity is smaller and transfer fan 3a in room 2a where the difference in humidity is larger. Specifically, air volume determining section 40 sets, for example, the air volume of transfer fan 3c and transfer fan 3a to Air Volume 10. In this case, as indicated in FIG. 8C, the humidity of room 2c is improved first. At this time, before the humidity of room 2c is improved, the low humidity air from room 2c and the high humidity air from room 2a are mixed and compensated with each other, therefore, the fluctuation in humidity of the air-conditioned room can be minimized. Because the humidity of room 2a is high, the humidity of the air-conditioned room is expected to slightly increase, however, air-conditioned room humidity control section 55 may activate dehumidifier 17 accordingly. This process can also contribute to the energy efficiency control and a downsized air-conditioned room.

Air volume determining section 40 counts the number of the rooms where the difference in humidity from the air-conditioned room is smaller and larger. If none of them are present, it means that one high-humidity room or one low-humidity room is present. In this case, air volume determining section 40 sets a certain amount of air volume to such high- or low-humidity room so that the humidity can be within the specified humidity range (S304: No→S306).

The air-conditioning process is explained hereinbefore. After this process is executed for the first time, air-conditioned room humidity control process S100 and fan air volume setting process S200 are independently repeated.

The air-conditioning system and the system controller in accordance with the present disclosure are explained hereinbefore, however, the above mentioned embodiments are only examples and not limited thereto.

For example, multiple circulation fan 6a through 6d and multiple transfer fan 3a through 3d are communicated with each other by ducts connecting the multiple rooms and the air-conditioned room. However multiple circulation fan 6a through 6d are not necessarily connected by the ducts, a space such as a hallway between the multiple rooms can be also considered as the ducts. In this case, the air in each of the rooms is transferred to the hallway from the multiple rooms by multiple circulation fan 6a through 6d. The air of the hallway transferred from the multiple rooms is introduced into air-conditioned room 18 communicated with the hallway. The air may be introduced into air-conditioned room 18 by separately installing a circulation fan on the hallway wall adjacent to air-conditioned room 18 or by depressurization of air-conditioned room 18 without using the circulation fan. This is expected to provide less efficiency in air circulation compared to the duct connection described above, however it can also contribute to the air-conditioning system.

Figure 9:
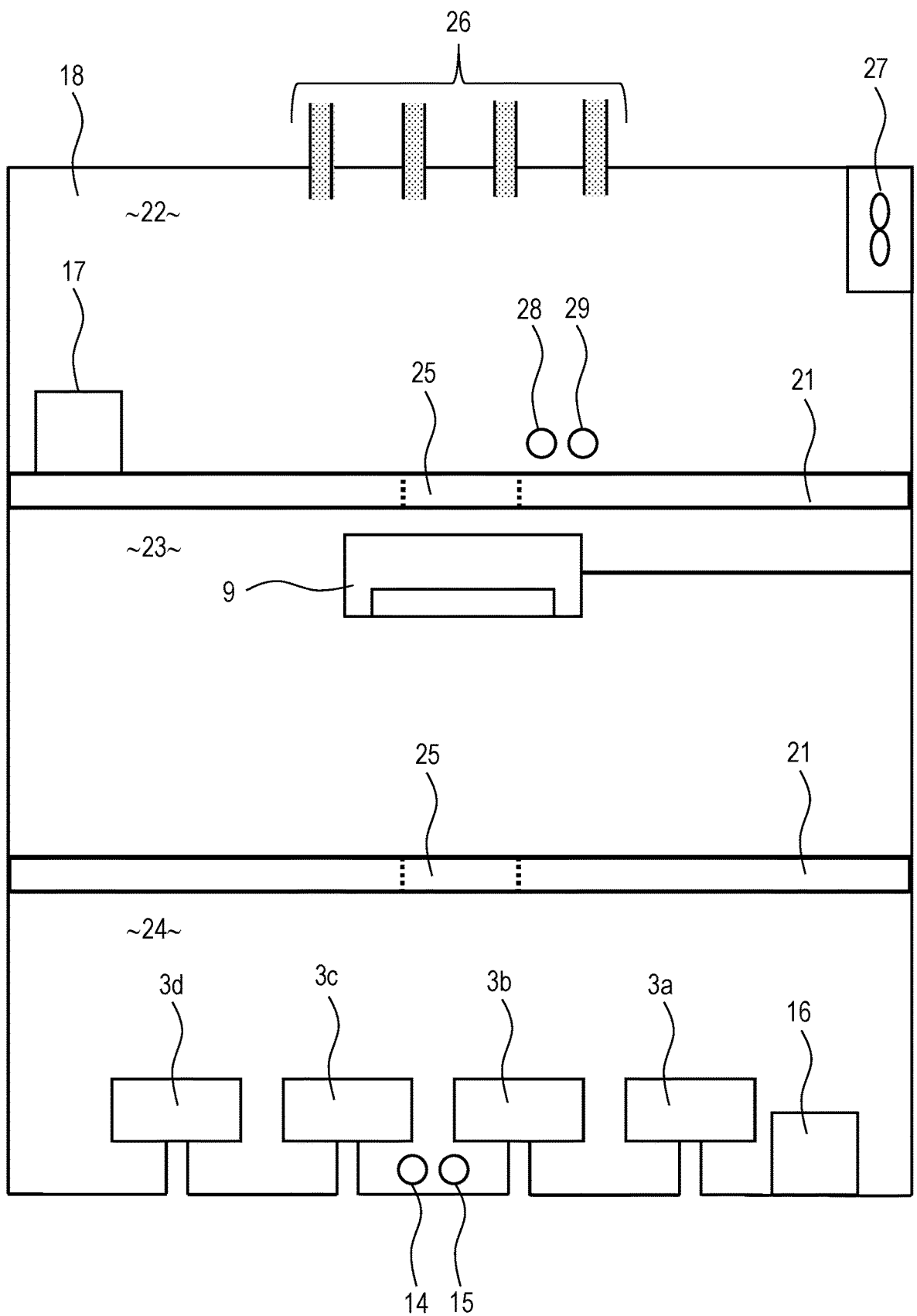
FIG. 9 is a schematic view of the air-conditioned room where it is divided into three spaces.
Figure 10:
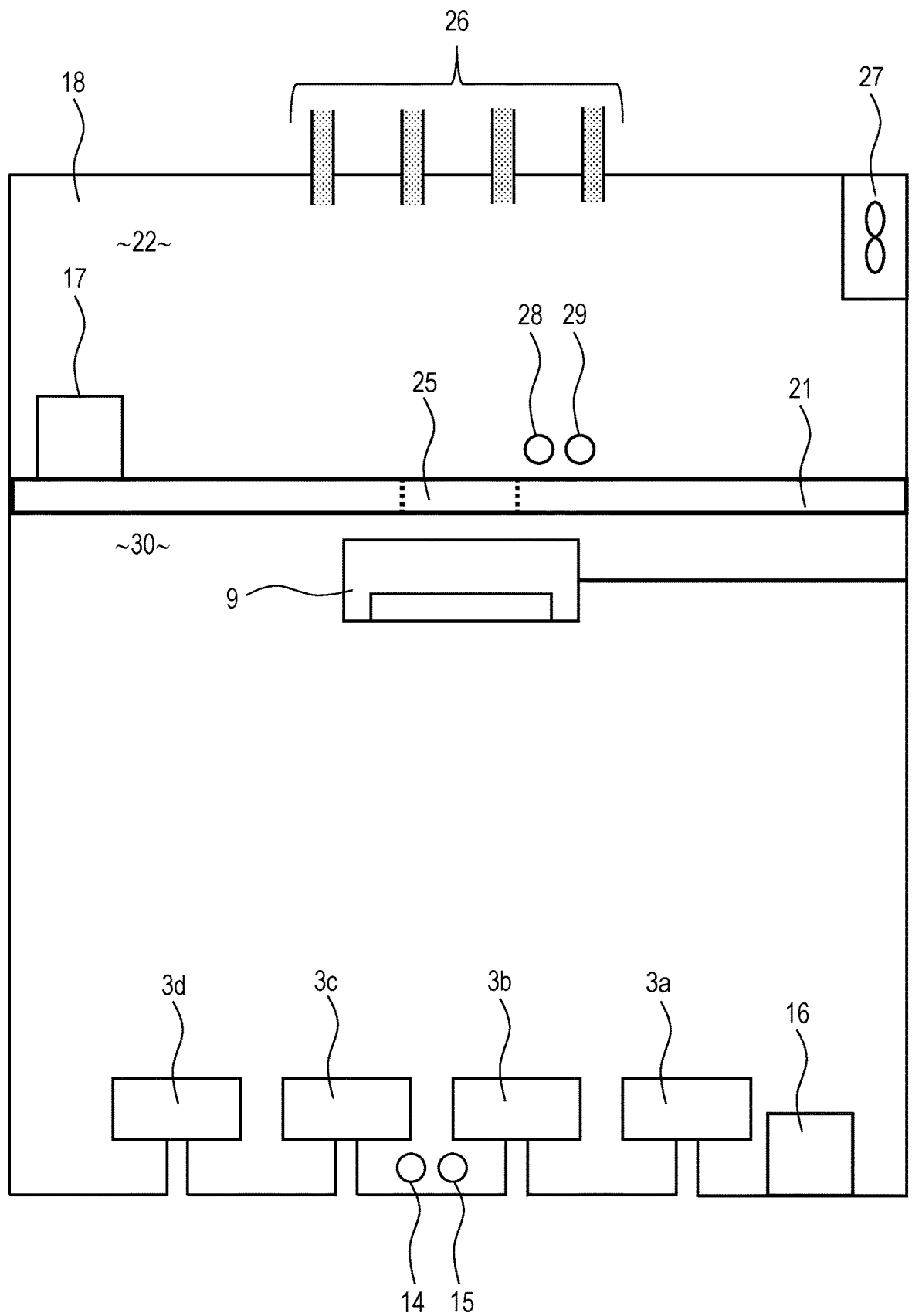
FIG. 10 is a schematic view of the air-conditioned room where it is divided into two spaces.
Figure 11:
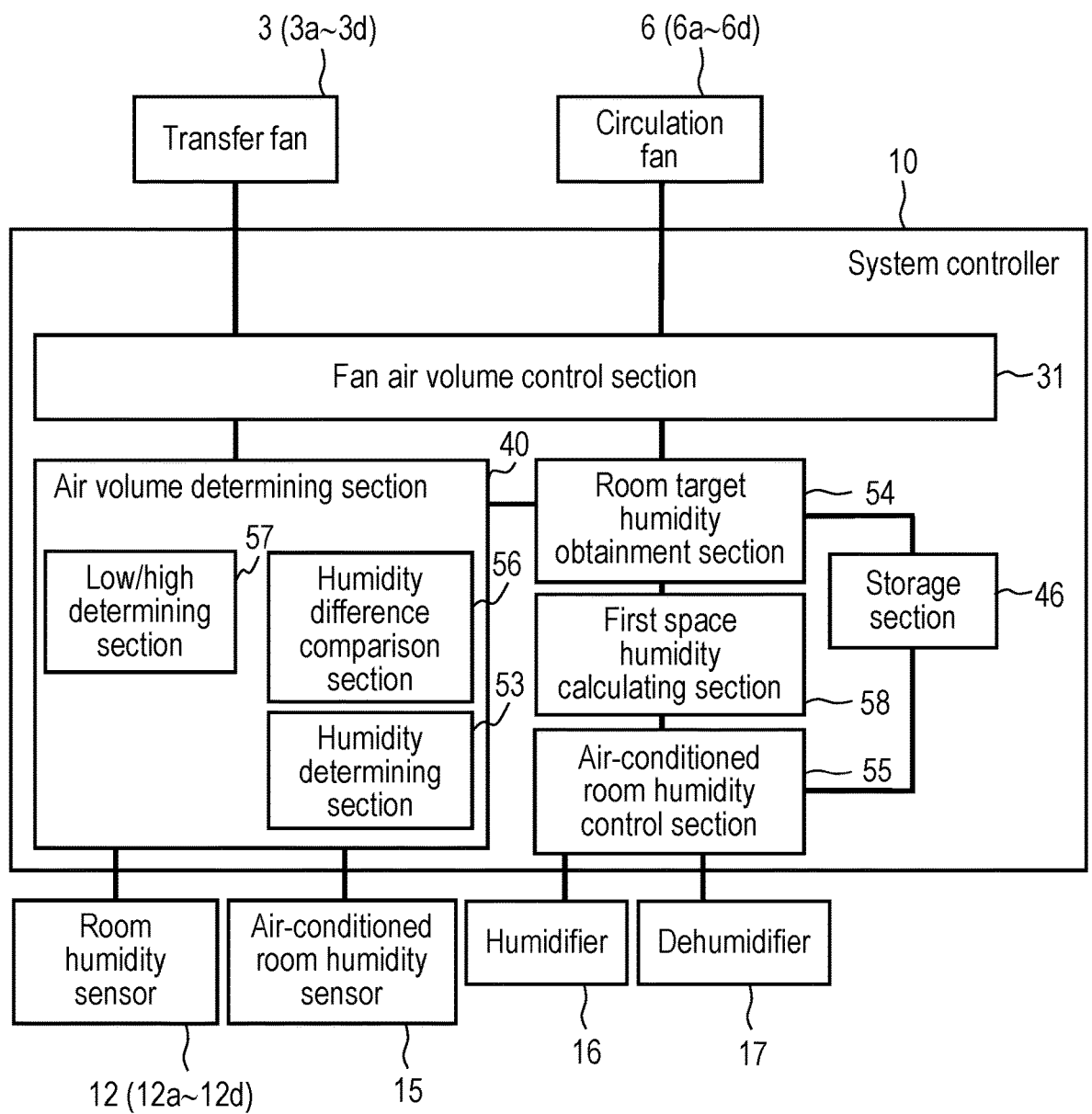
FIG. 11 is a schematic function block diagram of the system controller where the air-conditioned room is divided into three spaces.

Next, air-conditioning system 18 in accordance with a first embodiment of the present disclosure is explained with reference to FIG. 9, FIG. 10 and FIG. 11. FIG. 9 and FIG. 10 are schematic views of air-conditioning system 18 in accordance with the first embodiment. FIG. 9 is the schematic view of the air-conditioning room where it is divided into three spaces and FIG. 10 is the schematic view of the air-conditioning room where it is divided into two spaces. FIG. 11 is a schematic function block diagram of the system controller where the air-conditioned room is divided into three spaces. FIG. 11 is the same as the schematic function block diagram indicated in FIG. 2 except that first space humidity calculating section 58 is added there.

By the way, air-conditioning system 18 is not divided in FIG. 1 described above. That is, air conditioner 9, humidifier 16 and dehumidifier 17 controls the temperature and humidity in the same space. On the other hand, dividing air-conditioned room 18 achieves efficient dehumidification and humidification in FIG. 9 and FIG. 10.

Specifically, as indicated in FIG. 9, the dehumidification, humidification and temperature control are provided in a separate space respectively. For example, air-conditioned room18 is divided into three independent spaces, first space 22, second space 23 and third space 24 by partition board 21 in FIG. 9. Also in this case, system controller 10 controls air conditioner 9, humidifier 16 and dehumidifier 17 as described above. First space 22, second space 23 and third space 24 are disposed in turn from an upstream to downstream and each of multiple transfer fan 3 transfers air of the space downstream.

Partition board 21 serves as a separation between first space 22 and second space 23 and the same between second space 23 and the third space 24, and is made of a wooden or gypsum board. Additionally, partition board 21 can prevent heat or moisture transition between the spaces by applying insulation boards to it. And, partition board 21 has space-connecting opening 25 of a round or square hole on a part of it. Therefore, first space 22 and second space 23 as well as second space 23 and third space 24 can be independent spaces communicated with each other through space-connecting opening 25.

Space-connecting opening 25 has, for example, an opening area of 30% and under or preferably 20% and under relative to a contact area between first space 22 and second space 23 if no partition board 21 is provided. This is because, if space-connecting opening 25 is too large, contribution to efficiency of dehumidification and humidification capacity is reduced, on the other hand, if too small, increased pressure loss adversely affects ventilation efficiency between the spaces. And, space-connecting opening 25 is disposed as a mere opening here, however, installing a forced-air fan such as a pipe fan in the opening can increase the ventilation efficiency from the upstream independent space to the downstream independent space.

First space 22 includes first air supply opening 26 for supplying indoor air and second air supply opening 27 for supplying outdoor air in its upstream, and space-connecting opening 25 communicated with second space 23 in its downstream. And, dehumidifier 17, first space temperature sensor 28 and first space humidity sensor 29 are disposed in first space 22. This configuration provides mixture between the indoor air from first air supply opening 26 and the outdoor air from second air supply opening 27 in first space 22. The mixed air usually contains more fresh outdoor air than the indoor air. As the indoor air is transferred to multiple room 2a through 2d by multiple transfer fan 3a through 3d and returns into first space 22, the temperature and humidity of the indoor air is close to the target temperature and humidity set by system controller 10. On the other hand, the temperature and humidity of the outdoor air, for example, in a high temperature and humidity environment during summer or rainy season, are higher than the target temperature and humidity previously set. As described above, as the outdoor air is supplied more than the indoor air to first space 22, first space 22 is subject to the high temperature and humidity environment. The mixed air of first space 22, if its humidity is higher than the target humidity of air-conditioned room 18, is dehumidified by dehumidifier 17 in first space 22 to reach the target humidity of the air-conditioned room. The dehumidified air is transferred into second space 23 via space-connecting opening 25. The detail is explained later.

First space temperature sensor 28 obtains the temperature of first space 22 to transmit it system controller. As described above, as the outdoor air and the air transferred from each of multiple room 2 are mixed in first space 22, first space temperature sensor 28 is preferably disposed downstream, that is, adjacent to space-connecting opening 25 so that information on entire first space 22 can be obtained.

First space humidity sensor 29 obtains the humidity of first space 22 to transmit it system controller. For the same reason as first space temperature sensor 28, first space humidity sensor 29 is also preferably disposed downstream, that is, adjacent to space-connecting opening 25 so that information on entire first space 22 can be obtained.

Second space 23 includes space-connecting opening 25 communicated with first space 22 in its upstream and the same communicated with third space 24 in its downstream. And, air conditioner 9 is disposed in second space 23. In this configuration, the air dehumidified in first space 22 is cooled or heated by air conditioner 9 in second space 23 so that the temperature of second space 23 can reach the target temperature of the air-conditioned room previously set. Then, the cooled or heated air is transferred to third space 24 via space-connecting opening 25 communicated with third space 24.

Third space 24 includes space-connecting opening 25 communicated with second space 23 in its upstream and multiple transfer fan 3a through 3d in its downstream. And, humidifier 16 is disposed in third space 24. Additionally, air-conditioned room temperature sensor 14 and air-conditioned room humidity sensor 15 are disposed in the downstream of third space 24, that is, adjacent to multiple transfer fan 3a through 3d. In this configuration, the air cooled or heated in second space 23 is humidified by humidifier 16 in third space 24 so that the humidity can reach the target humidity of the air-conditioned room previously set if it is lower than the target humidity of the air-conditioned room. The humidified air is transferred to multiple room 2a through 2d via multiple transfer fan 3a through 3d.

As this configuration provides separate control for the target temperature and humidity of the air-conditioned room in the independent spaces, efficient dehumidification and humidification can be achieved. Specific procedures and effects of the dehumidification and humidification are explained hereinafter.

For example, given that the air of air-conditioned room 18 is cooled or dehumidified in the high temperature and humidity environment during the summer or rainy season, air-conditioned room humidity control section 55 first calculates the difference between the target humidity of the air-conditioned room and the humidity of the same, that is, the humidity of third space 24. Then, if the humidity of third space 24 is higher than the target humidity of the air-conditioned room, dehumidifier 17 disposed in first space 22 dehumidifies the air. The air dehumidified in first space 22 is transferred to second space 23. In second space 23, if the temperature of second space 23 is higher than the target temperature of the air-conditioned room previously set, air conditioner 9 disposed in second space 23 cools the air. However, the relative humidity of the air dehumidified in first space 22 changes because the air is cooled in second space 23. On the other hand, in this configuration, the humidity of first space 22 is controlled by air-conditioned room humidity control section 55 so that it can be the specified humidity lower than the humidity (relative humidity) of the air transferred outside air-conditioned room 18 through multiple transfer fan 3. That is, first space humidity calculating section 58 calculates the humidity to be reached in first space 22 in anticipation that the air is cooled by air conditioner 9.

Specifically, first space humidity calculating section 58 calculates the humidity to be reached in first space 22 in the following procedures according to the target humidity (relative humidity) and temperature of the transferred air previously set and the temperature of first space 22.

Firstly, first space humidity calculating section 58 calculates an amount of moisture of the transferred air, that is, an absolute humidity according to the target humidity (relative humidity) and temperature of the transferred air previously set. During the summer or rainy season, the air is transferred to multiple room 2a through 2d from third space 24 after it is cooled in second space 23 as described above. That is, determining the absolute humidity in first space 22 means that the humidity of the air transferred to multiple room 2a through 2d is equal to the target absolute humidity. After first space humidity calculating section 58 calculates the absolute humidity of the transferred air, the temperature of first space 22 is detected. Thus, the humidity (relative humidity) to be reached at the temperature of first space 22 can be calculated. During the summer or rainy season, the temperature of second space 23 is cooled by air conditioner 9 accordingly in response to the temperature of first space 22. Therefore, the humidity of first space 22 (relative humidity) is lower than that (relative humidity) of second space 23. As such, the humidity of first space 22 (relative humidity) is controlled to be lower than that (relative humidity) of the transferred air.

As described above, during the summer or rainy season, the high temperature and humidity air is transferred to first space 22. The higher the temperature is, the more saturated water vapor can be held in the air. If the air of first space 22 is dehumidified in such an environment, an abundance of moisture can be removed from the air by slightly reducing the temperature of a heat exchanger provided in dehumidifier 17. That is, efficient air dehumidification can be achieved.

Also during the rainy season, if air conditioner 9 and dehumidifier 17 are disposed together in air-conditioned room 18, air conditioner 9 is in a thermo-off state because the difference in temperature between the outdoor and air-conditioned room 18 is small. In this case, as only dehumidifier 17 is activated, the temperature of air-conditioned room 18 is higher than that of the outdoor due to heat radiation from dehumidifier 17, then the high temperature air is transferred to multiple room 2a through 2d. However, dehumidifying first space 22 in advance allows the air heated by the heat radiation from dehumidifier 17 to be transferred to air conditioner 9, thus, air conditioner 9 cools the air so that it can reach the target temperature of the air-conditioned room previously set. And air-conditioned room 18 is expected to be relatively small, therefore, if air conditioner 9 and dehumidifier 17 are disposed together in air-conditioned room 18, it is difficult to control to reach the target temperature previously set because cooling the air by air conditioner 9 and heating the air by the heat radiation from dehumidifier 17 are simultaneously provided. However, as air-conditioned room 18 is divided, it allows the heat radiation from dehumidifier 17 to be separated from second space 23 where air conditioner 9 is installed, thus, it is easy to control to reach the air-conditioned room target temperature and humidity previously set.

For example, given that the air of air-conditioned room 18 is heated or humidified in the low temperature and humidity environment during winter. Air-conditioned room humidity control section 55 first detects the humidity of first space 22, then determines whether to dehumidify first space 22. However, the air of very low humidity in winter is not required to be dehumidified. That is, the indoor air from first air supply opening 26 and the outdoor air from second air supply opening 27 are only mixed in first space 22.

Next, the air of second space 23, if it is lower than the target temperature of the air-conditioned room previously set, is heated by air conditioner 9 to reach the target temperature. However, the humidity (relative humidity) of second space 23 is significantly reduced due to the heating. The air heated to the target temperature of the air-conditioned room in second space 23 is transferred to third space 24.

In third space 24, air-conditioned room humidity control section 55 calculates the difference between the target humidity of the air-conditioned room previously set and the humidity of third space 24. Then, if the humidity of third space 24 is lower than the target humidity of the air-conditioned room, air-conditioned room humidity control section 55 controls to humidify the air by humidifier 16 disposed in third space 24. Thus, multiple transfer fan 3a through 3d in third space 24 transfer the air at the air-conditioned room target temperature and humidity previously set.

In this configuration, the air heated by air conditioner 9 is transferred to third space 24. The higher the temperature is, the more saturated water vapor can be held in the air, that is, the absolute humidity can be increased. Thus, the air of third space 24 can efficiently absorb the moisture from humidifier 16. That is, the air of third space 24 is more efficiently humidified to reach the air-conditioned room target humidity previously set, then it can be transferred to multiple room 2a through 2d from multiple transfer fan 3a through 3d.

The configuration of air-conditioned room 18 where it is divided into three spaces in the air-conditioning system in accordance with the present disclosure are explained hereinbefore, however, the above described embodiments are only examples, not limited thereto.

For example, as indicated in FIG. 10, second space 23 may be combined with third space 24 to form second/third space 30 instead. In other words, the air can be cooled or heated in the same space.

In the high temperature and humidity environment during the summer or rainy season, same as where the air-conditioned room is divided into three spaces as described above, the air is dehumidified in first space 22 and then cooled in second/third space 30. And, in the low temperature and humidity environment during the winter, the air is simultaneously heated and humidified in second/third space 30. In this configuration, the humidifying efficiency gets worse than that of the three-divided air-conditioned room because the air of the temperature lower than that of the air-conditioned room is transferred to second/third space 30 from first space 22. However, second/third space 30 can accommodate more volume of humidifying space than third space 24. That is, second/third space 30 can hold more amount of highly-humidified air than third space 24 and the air can be humidified to reach the air-conditioned room target humidity more efficiently. Additionally, partition board 21 can be reduced from two to one and this results in a cost reduction in air-conditioned room 18.

The room referred in the embodiments described above is not necessarily required to be occupied, and it may be considered as one space. That is, a hallway or kitchen may be also considered as one space equal to the room if it is mostly enclosed by something.

And, the air-conditioning system in accordance with the present disclosure is applicable to a single-family house or multi-family building such as an apartment. However, if applied to the multi-family building, a single system is installed per one family, each family is not considered as a single room.

INDUSTRIAL APPLICABILITY

An air-conditioning system and an air-conditioning system controller in accordance with the present disclosure are useful as those contributing to a downsized air-conditioned room by an efficient dehumidification and humidification.

REFERENCE MARKS IN THE DRAWINGS

1 general housing
2, 2a, 2b, 2c, 2d room
3, 3a, 3b, 3c, 3d transfer fan
4 outdoor air introducing fan
5, 5a, 5b, 5c, 5d exhaust fan
6, 6a, 6b, 6c, 6d circulation fan
10 system controller
11, 11a, 11b, 11c, 11d room temperature sensor
12, 12a, 12b, 12c, 12d room humidity sensor
14 air-conditioned room temperature sensor
15 air-conditioned room humidity sensor
16 humidifier
17 dehumidifier
18 air-conditioned room
19 input/output terminal
20 air-conditioning system
21 partition board
22 first space
23 second space
24 third space
25 space-connecting opening
26 first air supply opening
27 second air supply opening
28 first space temperature sensor
29 first space humidity sensor
30 second/third space
31 fan air volume control section
40 air volume determining section
53 humidity determining section
54 room target humidity obtainment section
55 air-conditioned room humidity control section
56 humidity difference comparison section
57 low/high determining section
58 first space humidity calculating section

The invention claimed is:

1. An air-conditioning system comprising:
a humidifier for humidifying air of conditioned room;
a dehumidifier for dehumidifying air of the air-conditioned room;
multiple transfer fans, each for transferring air of the air-conditioned room to a corresponding one of multiple rooms, wherein each of the multiple rooms are separate from the air-conditioned room;
a system controller for controlling the humidifier, the dehumidifier and the multiple transfer fans;
a room humidity sensor located in each of the multiple rooms to obtain a respective indoor humidity of each of the multiple rooms, and to transmit each respective indoor humidity to the system controller; and
an air-conditioned room humidity sensor for obtaining a humidity of the air-conditioned room to transmit the humidity to the system controller,
wherein the system controller is configured to:
control at least one of the humidifier and the dehumidifier to maintain the humidity of the air-conditioned room within a specified humidity range defined by a lowest humidity and a highest humidity;
determine an air volume of each of the transfer fans according to each respective indoor humidity of each of the multiple rooms obtained by the respective room humidity sensor and the humidity of the air-conditioned room obtained by the air-conditioned room humidity sensor; and
control the air volume of each of the transfer fans at the respective air volume determined by the controller.

2. The air-conditioning system according to claim 1,
wherein the controller is configured to determine the air volume of each of the transfer fans by:
determining whether each respective indoor humidity of each of the multiple rooms is within the specified humidity range according to each respective indoor humidity of each of the multiple rooms obtained by the room humidity sensor and the specified humidity range; and
calculating a difference in humidity between each respective indoor humidity of each of the multiple rooms obtained by the respective room humidity sensor and the humidity of the air-conditioned room obtained by the air-conditioned room humidity sensor, and
determining the air volume of each of the transfer fans according to the difference in humidity calculated by the controller if the controller determines that each respective indoor humidity of each of the multiple rooms is not within the specified humidity range.

3. The air-conditioning system according to claim 2,
wherein the controller is configured to determine the air volume of a first transfer fan for a respective first room where the difference in humidity is larger to be greater than the air volume of a second transfer fan for a respective second room where the difference in humidity is smaller according to the calculated difference in humidity calculated by controller.

4. The air-conditioning system according to claim 1,
wherein the controller is configured to determine the air volume of each of the transfer fans by:
determining whether the respective indoor humidity of each of the multiple rooms is within the specified humidity range according to the respective indoor humidity of each of the multiple rooms obtained by the room humidity sensor and the specified humidity range; and determining whether the respective indoor humidity of each of the multiple rooms obtained by the room humidity sensor is lower or higher than the humidity of the air-conditioned room, and determining the air volume of each of the transfer fans according to whether the respective indoor humidity of each of the multiple rooms is lower or higher than the humidity of the air-conditioned room, as determined by the controller, if the controller determines that the respective indoor humidity of each of the multiple rooms is not within the specified humidity range.

5. The air-conditioning system according to claim 4, wherein the controller is configured to determine a same air volume of each of the transfer fans if the controller determines that a room with humidity higher than the highest humidity and a room with humidity lower than the lowest humidity are present among the multiple rooms.

6. The air-conditioning system according to claim 4, wherein the controller is configured to determine the air volume of each of the transfer fans by:

calculating a difference between the respective indoor humidity of each of the multiple rooms obtained by the room humidity sensor and the humidity of the air-conditioned room obtained by the air-conditioned room humidity sensor, and determining the air volume of each of the transfer fans according to the calculated difference in humidity calculated by the controller if the controller determines that a room with humidity higher than the highest humidity and a room with humidity lower than the lowest humidity are present among the multiple rooms.

7. The air-conditioning system according to claim 6, wherein the controller is configured to additionally determine more air volume for the transfer fan transferring air to a corresponding room where the calculated difference in humidity from is smaller than the air volume for the transfer fan transferring air to a corresponding room where the calculated difference in humidity is larger if the controller determines that the room with humidity higher than the highest humidity and the room with humidity lower than the lowest humidity are present among the multiple rooms.

8. The air-conditioning system according to claim 1, wherein the air-conditioned room includes:
a first space having an air supply opening;
the dehumidifier for dehumidifying air of the first space;
a second space communicated with the first space and disposed downstream of the first space of the air-conditioned room;
an air conditioner for conditioning air of the second space; and
the multiple transfer fans for transferring air conditioned by the air conditioner out of the air-conditioned room.

9. The air-conditioning system according to claim 8, comprising:
a third space communicated with the first space and disposed downstream of the first space; and
the humidifier for humidifying air of the third space.

10. The air-conditioning system according to claim 9, wherein the second space is combined with the third space.

11. The air-conditioning system according to claim 9, wherein the second space is disposed downstream of the first space and upstream of the third space.

12. An air-conditioning system controller,
wherein the air-conditioning system controller controls:
a humidifier for humidifying air of an air-conditioned room;
a dehumidifier for dehumidifying air of the air-conditioned room; and
multiple transfer fans, each for transferring air of the air-conditioned room to a corresponding one of multiple rooms, wherein each of the multiple rooms are separate from the air-conditioned room, and
the air-conditioning system controller is configured to:
control at least one of the humidifier and the dehumidifier to maintain a humidity of the air-conditioned room within a specified humidity range defined by a lowest humidity and a highest humidity;
determine an air volume of each of the transfer fans according to a respective indoor humidity of each of the multiple rooms and the humidity of the air-conditioned room; and
control the air volume of each of the transfer fans at the respective air volume determined by the controller.

* * * * *